(12) United States Patent
Larson et al.

(10) Patent No.: US 7,103,654 B2
(45) Date of Patent: Sep. 5, 2006

(54) SERVER SYSTEM WITH SEGREGATED MANAGEMENT LAN AND PAYLOAD LAN

(75) Inventors: Thane M. Larson, Roseville, CA (US); Kirk Bresniker, Roseville, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 847 days.

(21) Appl. No.: 09/923,881

(22) Filed: Aug. 7, 2001

(65) Prior Publication Data
US 2003/0031189 A1   Feb. 13, 2003

(51) Int. Cl.
G06F 15/173 (2006.01)
G06F 15/16 (2006.01)

(52) U.S. Cl. .................. 709/223; 709/238; 709/250

(58) Field of Classification Search ............... 709/223, 709/224, 226, 203, 238, 250; 327/143, 156
See application file for complete search history.

(56) References Cited

U.S. PATENT DOCUMENTS

| 5,544,006 | A | 8/1996 | Radloff et al. |
| 5,809,262 | A | 9/1998 | Potter |
| 5,841,990 | A | * 11/1998 | Picazo et al. ............... 709/249 |
| 5,933,591 | A | 8/1999 | Mazzurco |
| 5,984,688 | A | 11/1999 | Norris |
| 6,046,912 | A | 4/2000 | Leman |
| 6,058,011 | A | 5/2000 | Hardt et al. |
| 6,112,271 | A | 8/2000 | Lanus et al. |
| 6,129,591 | A | 10/2000 | Czeschka |
| 6,138,247 | A | 10/2000 | McKay et al. |
| 6,161,197 | A | 12/2000 | Lanus et al. |
| 6,162,073 | A | 12/2000 | Haq et al. |
| 6,166,902 | A | 12/2000 | Liu et al. |
| 6,185,093 | B1 | 2/2001 | Moss |
| 6,185,110 | B1 | 2/2001 | Liu |
| 6,195,262 | B1 | 2/2001 | Bodette et al. |
| 6,198,633 | B1 | 3/2001 | Lehman et al. |
| 6,209,051 | B1 | 3/2001 | Hill et al. |
| 6,237,048 | B1 | 5/2001 | Allen et al. |
| 2002/0180498 | A1* | 12/2002 | O'Leary et al. ............ 327/156 |

FOREIGN PATENT DOCUMENTS

| DE | 29712080 U | 7/1997 |
| EP | 0841774 A2 | 5/1998 |
| JP | 4077028 A | 3/1992 |
| WO | WO02/23855 | 3/2002 |
| WO | WO02/37745 | 5/2002 |

OTHER PUBLICATIONS

PCI Industrial Computers Manufacturers Group (PCIMG); "CompactPCI Specification Short Form"; Sep. 2, 1997; pp. 1-7.
Ziatech; www.ziatech.com (homepage); Ziatech, an Intel company, Leaders in CompactPCI Innovation; 2001.

* cited by examiner

Primary Examiner—Paul H. Kang

(57) ABSTRACT

A cPCI server system includes a plurality of host processor cards for providing management LAN communications and payload LAN communications. A first card is coupled to the plurality of host processor cards and is coupled to a payload LAN. The plurality of host processor cards are configured to provide payload LAN communications through the first card. A second card is coupled to the plurality of host processor cards and can be optionally coupled to a management LAN. The plurality of host processor cards are configured to provide management LAN communications with the management LAN through the second card.

20 Claims, 6 Drawing Sheets

SERVER SYSTEM WITH SEGREGATED MANAGEMENT LAN AND PAYLOAD LAN

THE FIELD OF THE INVENTION

The present invention relates to server systems. More particularly, the invention relates to a compact peripheral component interconnect (cPCI) server system with a segregated management local area network (LAN) and payload LAN, which is used for server data traffic typically exposed or sent to a less secure environment, such as the Internet.

BACKGROUND OF THE INVENTION

Console communications are used in server systems to send and receive status, control and configuration information. Console communications are typically transmitted and received via a single LAN interface (i.e., a LAN that combines console and payload communications), or via a cable to an RS-232 port on a server.

When there is no console LAN, each server typically includes an RS-232 port for console communications. When a large number of servers are to be controlled, a complex, hard-to-manage wiring bundle to each individual server's RS-232 port must be implemented. Using an RS-232 port for console communications is sufficient for a standalone server, but when the server is integrated with many others in a common chassis, a separate cable for each server is difficult to maintain and configure. If any consolidation is to be done, it is typically implemented by a separate device outside of the chassis. Consequently, most customers route all of the cables a short distance to a special switch, such as those made by Raritan and Lantronics. Though this simplifies the cable bundle by giving a single port of access to the congregation of servers, it adds cost to the system in terms of money and space.

If a single LAN interface is used, there is a security hole in that LAN console control information commingles with payload information on a single customer payload LAN. This commingling of signals on a single LAN allows for unauthorized snooping, and the potential for unauthorized communications to the console devices. For a single LAN interface, a security driven software layer can used (at additional cost), but there is a possibility that the security layer could be compromised.

It would be desirable for a server system to provide a more convenient and secure console communication system.

SUMMARY OF THE INVENTION

One form of the present invention provides a server system including a plurality of host processor cards for providing management LAN communications and payload LAN communications. A first card is coupled to the plurality of host processor cards and is coupled to a payload LAN. The plurality of host processor cards are configured to provide payload LAN communications with the management LAN through the first card. A second card is coupled to the plurality of host processor cards and coupled to a management LAN. The plurality of host processor cards are configured to provide management LAN communications with the management LAN through the second card.

DESCRIPTION OF THE PREFERRED EMBODIMENTS

In the following detailed description of the preferred embodiments, reference is made to the accompanying drawings that form a part hereof, and in which is shown by way of illustration specific embodiments in which the invention may be practiced. It is to be understood that other embodiments may be utilized and structural or logical changes may be made without departing from the scope of the present invention. The following detailed description, therefore, is not to be taken in a limiting sense, and the scope of the present invention is defined by the appended claims.

I. Server System

Figure 1:
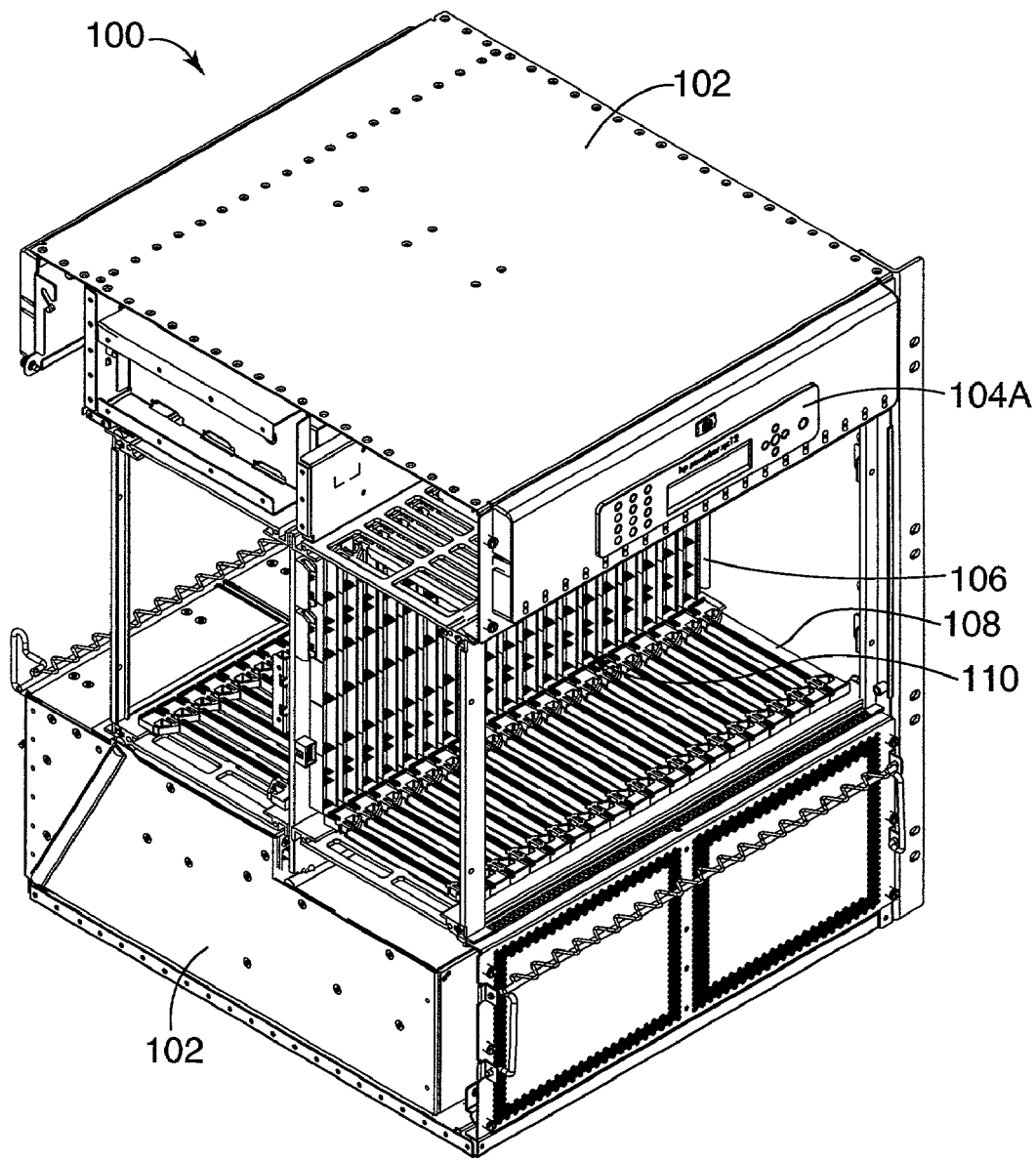
FIG. 1 is a front perspective view illustrating a server system according to one embodiment of the present invention.
Figure 2:
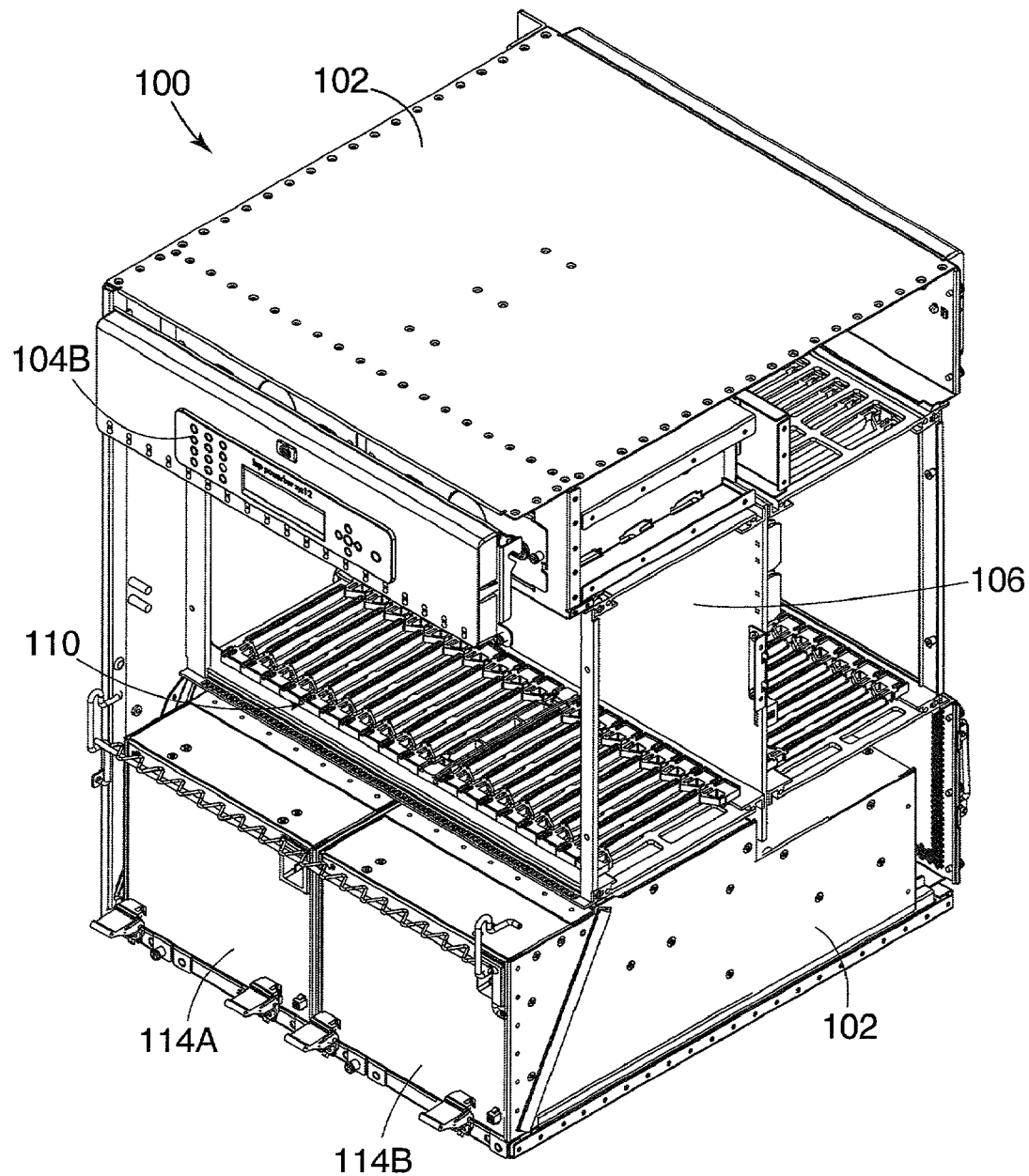
FIG. 2 is a rear perspective view illustrating the server system shown in FIG. 1.

FIG. 1 is a front perspective view illustrating a server system 100 according to one embodiment of the present invention. FIG. 2 is a rear perspective view illustrating server system 100. Server system 100 includes panels 102, liquid crystal display (LCD) panels 104A and 104B (collectively referred to as LCD panels 104), backplane 106, chassis 108, and dual redundant power supply units 114A and 114B (collectively referred to as power supply units 114). Panels 102 are attached to chassis 108, and provide protection for the internal components of server system 100. Backplane 106 is positioned near the center of server system 100. Backplane 106 is also referred to as midplane 106. LCD panels 104A and 104B are substantially identical, except for their placement on server system 100. LCD panel 104A is positioned on a front side of server system 100, and LCD panel 104B is positioned on a back side of server system 100.

Power supply units 114 are positioned at the bottom of server system 100 and extend from a back side of server system 100 to a front side of server system 100. Power supply units 114 each include an associated cooling fan 304 (shown in block form in FIG. 3). In one form of the invention, additional cooling fans 304 are positioned behind LCD panel 104B. In one embodiment, 4 chassis cooling fans 304 are used in server system 100. In an alternative embodiment, 6 chassis cooling fans 304 are used. Other numbers and placement of cooling fans 304 may be used. In one form of the invention, cooling fans 304 form an N+1 redundant cooling system, where "N" represents the total number of necessary fans 304, and "1" represents the number of redundant fans 304.

In one embodiment, server system 100 supports the Compact Peripheral Component Interconnect (cPCI) form factor of printed circuit assemblies (PCAs). Server system 100 includes a plurality of cPCI slots 110 for receiving cards/modules 300 (shown in block form in FIG. 3). In one embodiment, system 100 includes ten slots 110 on each side of backplane 106 (referred to as the 10 slot configuration). In an alternative embodiment, system 100 includes nineteen slots 110 on each side of backplane 106 (referred to as the 19 slot configuration). Additional alternative embodiments use other slot configurations.

Figure 3:
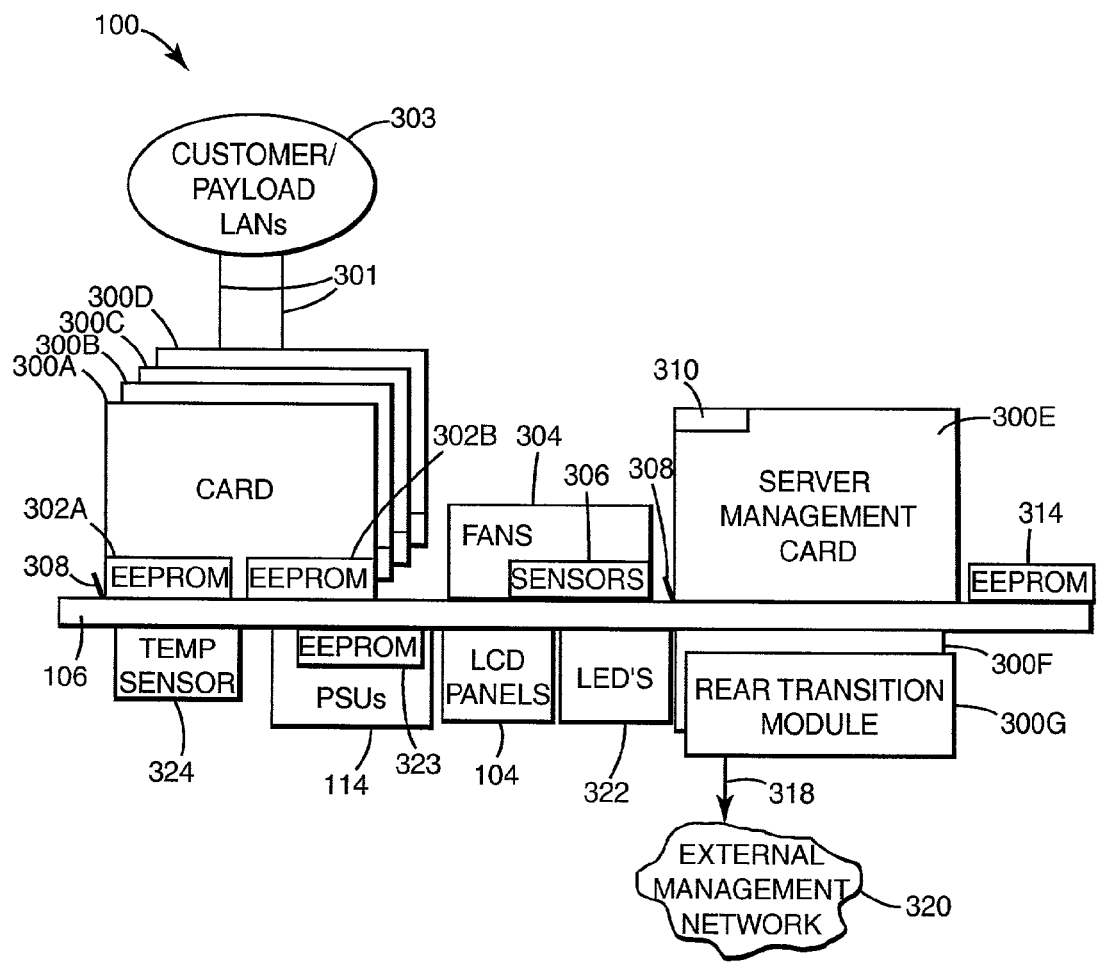
FIG. 3 is a block diagram illustrating major components of a server system according to one embodiment of the present invention.

FIG. 3 is a block diagram illustrating major components of server system 100. Server system 100 includes backplane 106, a plurality of cards/modules 300A–300G (collectively referred to as cards 300), fans 304, electrically erasable programmable read only memory (EEPROM) 314, LEDs 322, LCD panels 104, power supply units (PSUs) 114, and temperature sensor 324. Cards 300 are inserted in slots 110 (shown in FIGS. 1 and 2) in system 100. In one form of the invention, cards 300 may occupy more than one slot 110. In one embodiment, cards 300 include host processor cards 300A, hard disk cards 300B, managed Ethernet switch cards 300C and 300D, a server management card (SMC) 300E, and 2 redundant SMC local area network (LAN) rear transition modules (RTMs) 300F and 300G. In one embodiment, there is one managed Ethernet switch card 300C fitted in the 10 slot chassis embodiment, and up to two managed Ethernet switch cards 300C and 300D fitted in the 19 slot chassis embodiment. In one form of the invention, managed Ethernet switch cards 300C and 300D are "Procurve" managed Ethernet switch cards.

In one embodiment, two types of host processor cards 300A may be used in server system 100—PA-RISC host processor cards and IA32 host processor cards. Multiple host processor cards 300A and hard disk cards 300B are used in embodiments of server system 100, but are each represented by a single card in FIG. 3 to simply the figure. In one form of the invention, up to 8 host processor cards 300A are used in the 10 slot configuration, and up to 16 host processor cards 300A are used in the 19 slot configuration In one embodiment, each of cards 300 can be hot swapped.

In one embodiment, cards 300 each include a pair of EEPROMs 302A and 302B, which are discussed below. Power supply units 114 each include an EEPROM 323 for storing power supply identification and status information. Fans 304 include associated sensors 306 for monitoring the speed of the fans 304. In one embodiment, LEDs 322 include eight status LEDs, six LAN LEDs to indicate the speed and link status of LAN links 318, a blue hot swap status LED to indicate the ability to hot swap SMC 300E, a power-on indicator LED, and three fan control indicator LEDs.

The operational health of cards 300 and system 100 are monitored by SMC 300E to ensure the reliable operation of the system 100. SMC 300E includes serial ports 310 (discussed below), and an extraction lever 308 with an associated switch. In one embodiment, all cards 300 include an extraction lever 308 with an associated switch.

In one embodiment, SMC 300E is the size of a typical compact PCI (cPCI) card, and supports PA-RISC and the IA32 host processor cards 300A. SMC 300E electrically connects to other components in system 100, including cards 300, temperature sensor 324, power supply units 114, fans 304, EEPROM 314, LCD panels 104, LEDs 322, and SMC rear transition modules 300F and 300G via backplane 106. In most cases, the connections are via I²C buses 554 (shown in FIG. 5), as described in further detail below. The I²C buses 554 allow bi-directional communication so that status information can be sent to SMC 300E and configuration information sent from SMC 300E. In one embodiment, SMC 300E uses I²C buses 554 to obtain environmental information from power supply units 114, host processor cards 300A, and other cards 300 fitted into system 100.

SMC 300E also includes a LAN switch 532 (shown in FIG. 5) to connect console management LAN signals from the host processor cards 300A to an external management network (also referred to as management LAN) 320 via one of the two SMC rear transition modules 300F and 300G. In one embodiment, the two SMC rear transition modules 300F and 300G each provide external 10/100Base-T LAN links 318 for connectivity to management LAN 320. In one embodiment, SMC rear transition modules 300F and 300G are fibre-channel, port-bypass cards Managed Ethernet switch cards 300C and 300D are connected to host processor cards 300A through backplane 106, and include external 10/100/1000Base-T LAN links 301 for connecting host processor cards to external customer or payload LANs 303. Managed Ethernet switch cards 300C and 300D are fully managed LAN switches.

II. LCD Panel

Figure 4:
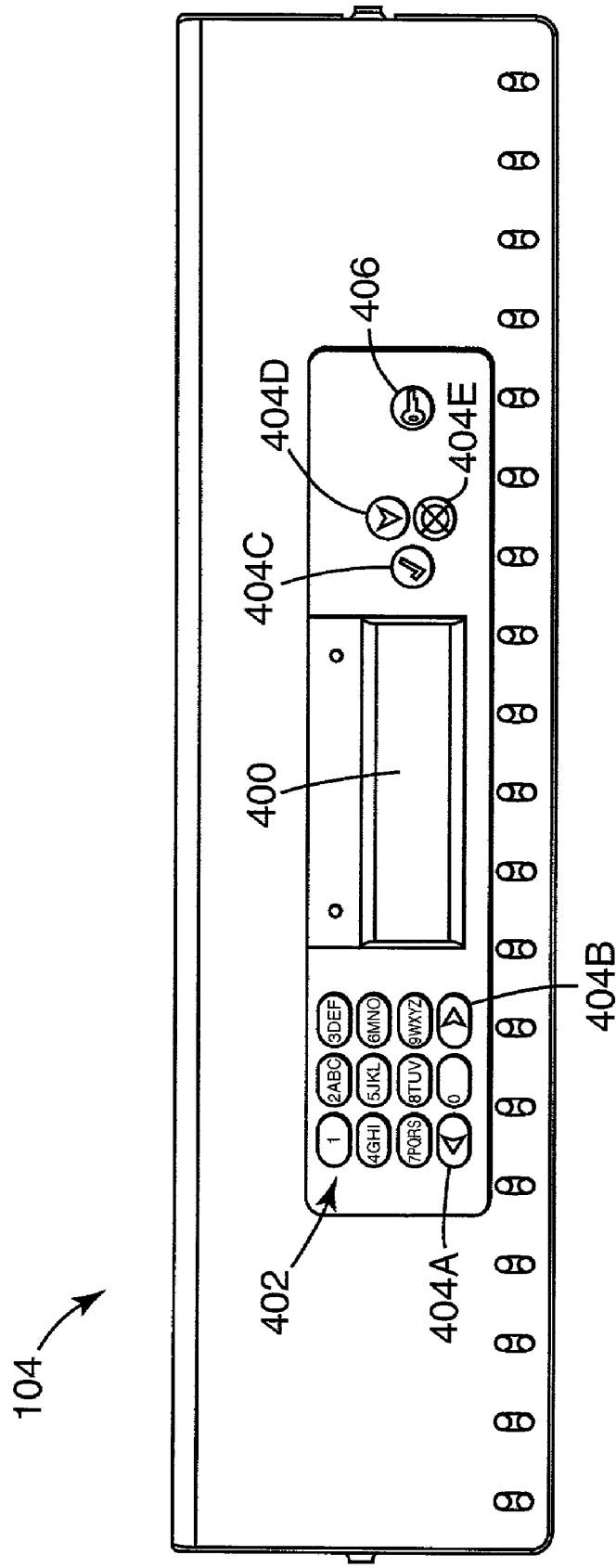
FIG. 4 is a front view of one of LCD panels used by a server system according to one embodiment of the present invention.

FIG. 4 is a front view of one of LCD panels 104. In one form of the invention, each LCD panel 104 includes a 2×20 LCD display 400, 10 alphanumeric keys 402, 5 menu navigation/activation keys 404A–404E (collectively referred to as navigation keys 404), and a lockout key 406 with associated LED (not shown) that lights lockout key 406. If a user presses a key 402, 404, or 406, an alert signal is generated and SMC 300E polls the LCD panels 104A and 104B to determine which LCD panel was used, and the key that was pressed.

Alphanumeric keys 402 allow a user to enter alphanumeric strings that are sent to SMC 300E. Navigation keys 404 allow a user to navigate through menus displayed on LCD display 400, and select desired menu items. Navigation keys 404A and 404B are used to move left and right, respectively, within the alphanumeric strings. Navigation key 404C is an "OK/Enter" key. Navigation key 404D is used to move down. Navigation key 404E is a "Cancel" key.

LCD panels 104 provide access to a test shell (discussed below) that provides system information and allows configuration of system 100. As discussed below, other methods of access to the test shell are also provided by system 100. To avoid contention problems between the two LCD panels 104, and the other methods of access to the test shell, a lockout key 406 is provided on LCD panels 104. A user can press lockout key 406 to gain or release control of the test shell. In one embodiment, lockout key 406 includes an associated LED to light lockout key 406 and indicate a current lockout status.

In one embodiment, LCD panels 104 also provide additional information to that displayed by LEDs 322 during start-up. If errors are encountered during the start-up sequence, LCD panels 104 provide more information about the error without the operator having to attach a terminal to one of the SMC serial ports 310.

III. Server Management Card (SMC)

A. SMC Overview

Figure 5:
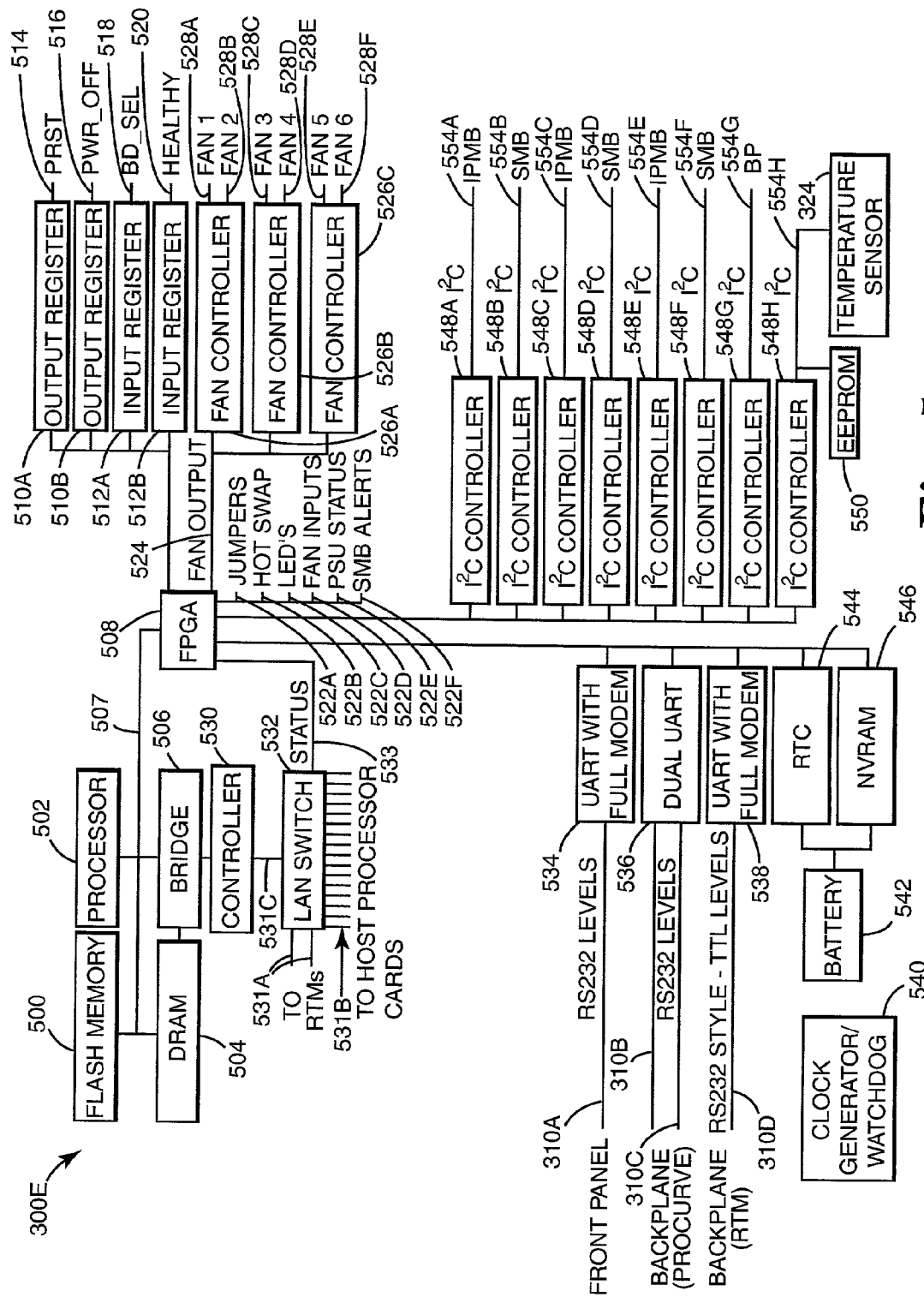
FIG. 5 is an electrical block diagram illustrating major components of a server management card (SMC) according to one embodiment of the present invention.

FIG. 5 is an electrical block diagram illustrating major components of server management card (SMC) 300E. SMC 300E includes flash memory 500, processor 502, dynamic random access memory (DRAM) 504, PCI bridge 506, field programmable gate array (FPGA) 508, output registers 510A and 510B, input registers 512A and 512B, fan controllers 526A–526C (collectively referred to as fan controllers 526), network controller 530, LAN switch 532, universal asynchronous receiver transmitter (UART) with modem 534, dual UART 536, UART with modem 538, clock generator/watchdog 540, battery 542, real time clock (RTC) 544, non-volatile random access memory (NVRAM) 546, I²C controllers 548A–548H (collectively referred to as I²C controllers 548), EEPROM 550, and temperature sensor 324. In one embodiment, components of SMC 300E are connected together via PCI buses 507. In one form of the invention, PCI buses 507 are not routed between slots 110. Switched LAN signals through LAN switch 532 are routed between slots 110.

Functions of SMC 300E include supervising the operation of other components within system 100 (e.g. fan speed, temperature, card present) and reporting their health to a central location (e.g., external management network 320), reporting any failures to a central location (e.g., external management network 320), providing a LAN switch 532 to connect console management LAN signals from the SMC 300E and host processor cards 300A to an external management network 320, and providing an initial boot configuration for the system 100.

B. SMC Processor And Memory

SMC 300E includes chassis management processor 502. In one embodiment, chassis management processor 502, also referred to as SMC processor 502, is a StrongARM SA-110 processor with supporting buffer. In one embodiment, SMC 300E uses a Linux operating system. SMC 300E also runs server management application (SMA) software/firmware. In one embodiment, the operating system and SMA are stored in flash memory 500. In one form of the invention, all information needed to power-up SMC 300E, and for SMC 300E to become operational, are stored in flash memory 500. In one embodiment, flash memory 500 includes 4 to 16 Mbytes of storage space to allow SMC 300E to boot-up as a stand-alone card (i.e., no network connection needed).

SMC 300E also includes DRAM 504. In one embodiment, DRAM 504 includes 32, 64 or 128 Mbytes of storage space. In one form of the invention, a hardware fitted table is stored in DRAM 504. The hardware fitted table includes information representing the physical configuration of system 100. The hardware fitted table changes if there is a physical change to system 100, such as by a hardware device being added to or removed from system 100. The hardware fitted table includes hardware type information (e.g., whether a device is an IA32/PA-RISC/Disk Carrier/RTM (i.e., rear transition module)/PSU/LCD panel/Modem/Unknown device, etc.), hardware revision and serial number, status information, configuration information, and hot-swap status information.

Processor 502 is coupled to FPGA 508. FPGA 508 includes 6 sets of input/output lines 522A–522F. Lines 522A are connected to jumpers for configuring SMC 300E. Lines 522B are hot swap lines for monitoring the hot swap status of cards 300. In one embodiment, hot swap lines 522B include 18 hot swap status input lines, which allow SMC 300E to determine the hot swap status of the host processor cards 300A, hard disk cards 300B, managed Ethernet switch cards 300C and 300D, SMC rear transition modules 300F and 300G, and power supply units 114. Lines 522C are LED lines that are coupled to LEDs 322. Lines 522D are fan input lines that are coupled to fan sensors 306 for monitoring the speed of fans 304. Lines 522E are power supply status lines that are coupled to power supply units 114 for determining whether both, or only one power supply unit 114 is present. Lines 522F are SMB alert lines for communicating alert signals related to SMB I²C buses 554B, 554D, and 554F.

C. Clock, Battery & NVRAM

SMC 300E includes a real time clock (RTC) 544 and an associated battery 542 to preserve the clock. Real time clock 544 provides the correct time of day. SMC 300E also includes NVRAM 546 for storing clock information. In one embodiment, NVRAM 546 uses the same battery as real time clock 544.

D. LAN switch

SMC 300E sends and receives management LAN communications through PCI bridge 506 and controller 530 to LAN switch 532. In one embodiment, LAN switch 532 is an unmanaged LAN switch including 19 ports, with two ports connected to SMC rear transition modules 300F and 300G (shown in FIG. 3) via links 531A for communications with external management network 320 (shown in FIG. 3), 16 ports for connecting to the management LAN connections of up to 16 host processor cards 300A via links 531B through backplane 106, and one port for connecting to the SMC's LAN port (i.e., output of controller 530) via links 531C. SMC 300E provides management support for console LAN management signals sent and received through LAN switch 532. SMC 300E provides control of management LAN signals of host processor cards 300A, managed Ethernet switches 300C and 300D, SMC processor 502, and SMC rear transition modules 300F and 300G. SMC 300E monitors the status of the management LAN connections of up to 16 host processor cards 300A to LAN switch 532, and reports an alarm event if any of the connections are lost. FPGA 508 and LAN switch 532 are coupled together via an RS-232 link 533 for the exchange of control and status information.

E. I²C Buses

Server system 100 includes eight I²C buses 554A–554H (collectively referred to as I²C buses 554) to allow communication with components within system 100. I²C buses 554 are coupled to FPGA 508 via I²C controllers 548. In one embodiment, the I²C buses 554 include 3 intelligent platform management bus (IPMB) buses 554A, 554C, and 554E, 3 system management bus (SMB) buses 554B, 554D, and 554F, a backplane ID bus (BP) 554G, and an I²C bus 554H for accessing SMC EEPROM 550 and chassis temperature sensor 324. A different number and configuration of I²C buses 554 may be used depending upon the desired implementation. SMC 300E maintains a system event log (SEL) within non-volatile flash memory 500 for storing information gathered over I²C buses 554.

The IPMB I²C buses 554A, 554C, and 554E implement the intelligent platform management interface (IPMI) specification. The IPMI specification is a standard defining an abstracted interface to platform management hardware. IPMI is layered over the standard I²C protocol. SMC 300E uses one or more of the IPMB I²C buses 554A, 554C, and 554E to retrieve static data from each of the host processor cards 300A and hard disk cards 300B. The static data includes identification information for identifying each of the cards 300A and 300B. Each slot 110 in system 100 can be individually addressed to retrieve the static configuration data for the card 300 in that slot 110. In one embodiment, the host processor cards 300A and hard disk cards 300B each include an EEPROM 302A (shown in FIG. 3) that stores the static identification information retrieved over IPMB I²C buses 554A, 554C, and 554E. In one embodiment, each EEPROM 302A contains the type of card, the name of the card, the hardware revision of the card, the card's serial number and card manufacturing information.

SMC 300E also uses one or more of the IPMB I²C buses 554A, 554C, and 554E, to retrieve dynamic environmental information from each of the host processor cards 300A and hard disk cards 300B. In one embodiment, this dynamic information is held in a second EEPROM 302B (shown in FIG. 3) on each of the cards 300A and 300B. In one form of the invention, the dynamic board data includes card temperature and voltage measurements. In one embodiment, SMC 300E can write information to the EEPROMs 302A and 302B on cards 300.

The three SMB I$^2$C buses 554B, 554D, and 554F also implement the IPMI specification. The three SMB I$^2$C buses 554B, 554D, and 554F, are coupled to LEDs 322, the two LCD panels 104, the dual redundant power supply units 114, and some of the host processor cards 300A. SMC 300E uses one or more of the SMB I$^2$C buses 554B, 554D, and 554F, to provide console communications via the LCD panels 104. In order for the keypad key-presses on the LCD panels 104 to be communicated back to SMC 300E, an alert signal is provided when keys are pressed that causes SMC 300E to query LCD panels 104 for the keys that were pressed.

SMC 300E communicates with power supply units 114 via one or more of the SMB I$^2$C buses 554B, 554D, and 554F to obtain configuration and status information including the operational state of the power supply units 114. In one embodiment, the dual redundant power supply units 114 provide voltage rail measurements to SMC 300E. A minimum and maximum voltage value is stored by the power supply units 114 for each measured rail. The voltage values are polled by SMC 300E at a time interval defined by the current configuration information for SMC 300E. If a voltage measurement goes out of specification, defined by maximum and minimum voltage configuration parameters, SMC 300E generates an alarm event. In one embodiment, power supply units 114 store configuration and status information in their associated EEPROMs 323 (shown in FIG. 3).

Backplane ID Bus (BP) 554G is coupled to backplane EEPROM 314 (shown in FIG. 3) on backplane 106. SMC 300E communicates with the backplane EEPROM 314 over the BP bus 554G to obtain backplane manufacturing data, including hardware identification and revision number. On start-up, SMC 300E communicates with EEPROM 314 to obtain the manufacturing data, which is then added to the hardware fitted table. The manufacturing data allows SMC 300E to determine if it is in the correct chassis for the configuration it has on board, since it is possible that the SMC 300E has been taken from a different chassis and either hot-swapped into a new chassis, or added to a new chassis and the chassis is then powered up. If there is no valid configuration on board, or SMC 300E cannot determine which chassis it is in, then SMC 300E waits for a pushed configuration from external management network 320, or for a manual user configuration via one of the connection methods discussed below.

In one embodiment, there is a single temperature sensor 324 within system 100. SMC 300E receives temperature information from temperature sensor 324 over I$^2$C bus 554H. SMC 300E monitors and records this temperature and adjusts the speed of the cooling fans 304 accordingly, as described below. SMC also uses I$^2$C bus 554H to access EEPROM 550, which stores board revision and manufacture data for SMC 300E.

F. Serial Ports

SMC 300E includes 4 RS-232 interfaces 310A–310D (collectively referred to as serial ports 310). RS-232 serial interface 310A is via a 9-pin Male D-type connector on the front panel of SMC 300E. The other three serial ports 310B–310D are routed through backplane 106. The front panel RS-232 serial interface 310A is connected via a UART with a full modem 534 to FPGA 508, to allow monitor and debug information to be made available via the front panel of SMC 300E. Backplane serial port 310D is also connected via a UART with a full modem 538 to FPGA 508. In one embodiment, backplane serial port 310D is intended as a debug or console port. The other two backplane serial interfaces 310B and 310C are connected via a dual UART 536 to FPGA 508, and are routed to managed Ethernet switches 300C and 300D through backplane 106. These two backplane serial interfaces 310B and 310C are used to connect to and configure the managed Ethernet switch cards 300C and 300D, and to obtain status information from the managed Ethernet switch cards 300C and 300D.

G. Fans and Temperature Control

In one embodiment, server system 100 includes six chassis fans 304. Server system 100 includes temperature sensor 324 to monitor the chassis temperature, and fan sensors 306 to monitor the six fans 304. In one embodiment, fan sensors 306 indicate whether a fan 304 is rotating and the fan's speed setting. In one form of the invention, FPGA 508 includes 6 fan input lines 522D (i.e., one fan input line 522D from each fan sensor 306) to monitor the rotation of the six fans 304, and a single fan output line 524 coupled to fan controllers 526A–526C. Fan controllers 526A–526C control the speed of fans 304 by a PWM (pulse width modulation) signal via output lines 528A–528F. If a fan 304 stalls, the monitor line 522D of that fan 304 indicates this condition to FPGA 508, and an alarm event is generated. The speed of fans 304 is varied to maintain an optimum operating temperature versus fan noise within system 100. If the chassis temperature sensed by temperature sensor 324 reaches or exceeds a temperature alarm threshold, an alarm event is generated. When the temperature reduces below the alarm threshold, the alarm event is cleared. If the temperature reaches or exceeds a temperature critical threshold, the physical integrity of the components within system 100 are considered to be at risk, and SMC 300E performs a system shut-down, and all cards 300 are powered down except SMC 300E. When the chassis temperature falls below the critical threshold and has reached the alarm threshold, SMC 300E restores the power to all of the cards 300 that were powered down when the critical threshold was reached.

In one embodiment, SMC 300E controls the power state of cards 300 using power reset (PRST) lines 514 and power off (PWR_OFF) lines 516. FPGA 508 is coupled to power reset lines 514 and power off lines 516 via output registers 510A and 510B, respectively. In one embodiment, power reset lines 514 and power off lines 516 each include 19 output lines that are coupled to cards 300. SMC 300E uses power off lines 516 to turn off the power to selected cards 300, and uses power reset lines 514 to reset selected cards 300. In one embodiment, a lesser number of power reset and power off lines are used for the 10 slot chassis configuration.

H. Clock Generator/Watchdog

SMC 300E is protected by both software and hardware watchdog timers. The watchdog timers are part of clock generator/watchdog block 540, which also provides a clock signal for SMC 300E. The hardware watchdog timer is started before software loading commences to protect against failure. In one embodiment, the time interval is set long enough to allow a worst-case load to complete. If the hardware watchdog timer expires, SMC processor 502 is reset.

I. Modes of Operation

In one embodiment, SMC 300E has three phases or modes of operation—Start-up, normal operation, and hot swap. The start-up mode is entered on power-up or reset, and controls the sequence needed to make SMC 300E operational. SMC 300E also provides minimal configuration information to allow chassis components to communicate on the management LAN. The progress of the start-up procedure can be followed on LEDs 322, which also indicate any errors during start-up.

The normal operation mode is entered after the start-up mode has completed. In the normal operation mode, SMC 300E monitors the health of system 100 and its components, and reports alarm events. SMC 300E monitors the chassis environment, including temperature, fans, input signals, and the operational state of the host processor cards 300A.

SMC 300E reports alarm events to a central point, namely an alarm event manager, via the management LAN (i.e., through LAN switch 532 and one of the two SMC rear transition modules 300F or 300G to external management network 320). The alarm event manager is an external module that is part of external management network 320, and that handles the alarm events generated by server system 100. The alarm event manager decides what to do with received alarms and events, and initiates any recovery or reconfiguration that may be needed. In addition to sending the alarm events across the management network, a system event log (SEL) is maintained in SMC 300E to keep a record of the alarms and events. The SEL is held in non-volatile flash memory 500 in SMC 300E and is maintained over power cycles, and resets of SMC 300E.

In the normal operation mode, SMC 300E may receive and initiate configuration commands and take action on received commands. The configuration commands allow the firmware of SMC processor 502 and the hardware controlled by processor 502 to be configured. This allows the operation of SMC 300E to be customized to the current environment. Configuration commands may originate from the management network 320, one of the local serial ports 310 via a test shell (discussed below), or one of the LCD panels 104.

The hot swap mode is entered when there is an attempt to remove a card 300 from system 100. In one embodiment, all of the chassis cards 300 can be hot swapped, including SMC 300E, and the two power supply units 114. An application shutdown sequence is initiated if a card 300 is to be removed. The shutdown sequence performs all of the steps needed to ready the card 300 for removal.

In one embodiment, FPGA 508 includes 18 hot swap status inputs 522B. These inputs 522B allow SMC 300E to determine the hot swap status of host processor cards 300A, hard disk cards 300C, managed Ethernet switch cards 300C and 300D, SMC rear transition module cards 300F and 300G, and power supply units 114. The hot-swap status of the SMC card 300E itself is also determined through this interface 522B.

An interrupt is generated and passed to SMC processor 502 if any of the cards 300 in system 100 are being removed or installed. SMC 300E monitors board select (BD_SEL) lines 518 and board healthy (HEALTHY) lines 520 of cards 300 in system 100. In one embodiment, board select lines 518 and healthy lines 520 each include 19 input lines, which are connected to FPGA 508 via input registers 512A and 512B, respectively. SMC 300E monitors the board select lines 518 to sense when a card 300 is installed. SMC 300E monitors the healthy lines 520 to determine whether cards 300 are healthy and capable of being brought out of a reset state.

When SMC 300E detects that a card has been inserted or removed, an alarm event is generated. When a new card 300 is inserted in system 100, SMC 300E determines the type of card 300 that was inserted by polling the identification EEPROM 302A of the card 300. Information is retrieved from the EEPROM 302A and added to the hardware fitted table. SMC 300E also configures the new card 300 if it has not been configured, or if its configuration differs from the expected configuration. When a card 300, other than the SMC 300E, is hot-swapped out of system 100, SMC 300E updates the hardware fitted table accordingly.

In one embodiment, SMC 300E is extracted in three stages: (1) an interrupt is generated and passed to the SMC processor 502 when the extraction lever 308 on the SMC front panel is set to the "extraction" position in accordance with the Compact PCI specification, indicating that SMC 300E is about to be removed; (2) SMC processor 502 warns the external management network 320 of the SMC 300E removal and makes the extraction safe; and (3) SMC processor 502 indicates that SMC may be removed via the blue hot swap LED 322. SMC 300E ensures that any application download and flashing operations are complete before the hot swap LED 322 indicates that the card 300E may be removed.

J. User Connectivity

In one embodiment, there are two test shells implemented within SMC 300E. There is an application level test shell that is a normal, run-time, test shell accessed and used by users and applications. There is also a stand-alone test shell that is a manufacturer test shell residing in flash memory 500 that provides manufacturing level diagnostics and functions. The stand-alone test shell is activated when SMC 300E boots and an appropriate jumper is in place on SMC 300E. The stand-alone test shell allows access to commands that the user would not, or should not have access to.

The test shells provide an operator interface to SMC 300E. This allows an operator to query the status of system 100 and (with the required authority level) to change the configuration of system 100.

A user can interact with the test shells by a number of different methods, including locally via a terminal directly attached to one of the serial ports 310, locally via a terminal attached by a modem to one of the serial ports 310, locally via one of the two LCD panels 104, and remotely via a telnet session established through the management LAN 320. A user may connect to the test shells by connecting a terminal to either the front panel serial port 310A or rear panel serial ports 310B–310D of SMC 300E, depending on the console/modem serial port configuration. The RS-232 and LAN connections provide a telnet console interface. LCD panels 104 provide the same command features as the telnet console interface. SMC 300E can function as either a dial-in facility, where a user may establish a link by calling to the modem, or as a dial-out facility, where SMC 300E can dial out to a configured number.

The test shells provide direct access to alarm and event status information. In addition, the test shells provides the user with access to other information, including temperature logs, voltage logs, chassis card fitted table, and the current setting of all the configuration parameters. The configuration of SMC 300E may be changed via the test shells. Any change in configuration is communicated to the relevant cards 300 in system 100. In one embodiment, configuration information downloaded via a test shell includes a list of the cards 300 expected to be present in system 100, and configuration data for these cards 300. The configuration information is stored in flash memory 500, and is used every time SMC 300E is powered up.

IV. Segregation of LANs

In one embodiment, LAN switch 532 physically separates console LAN communications from payload communications of the individual host processor cards 300A. This separation of communications will be described further with reference to FIG. 6.

Figure 6:
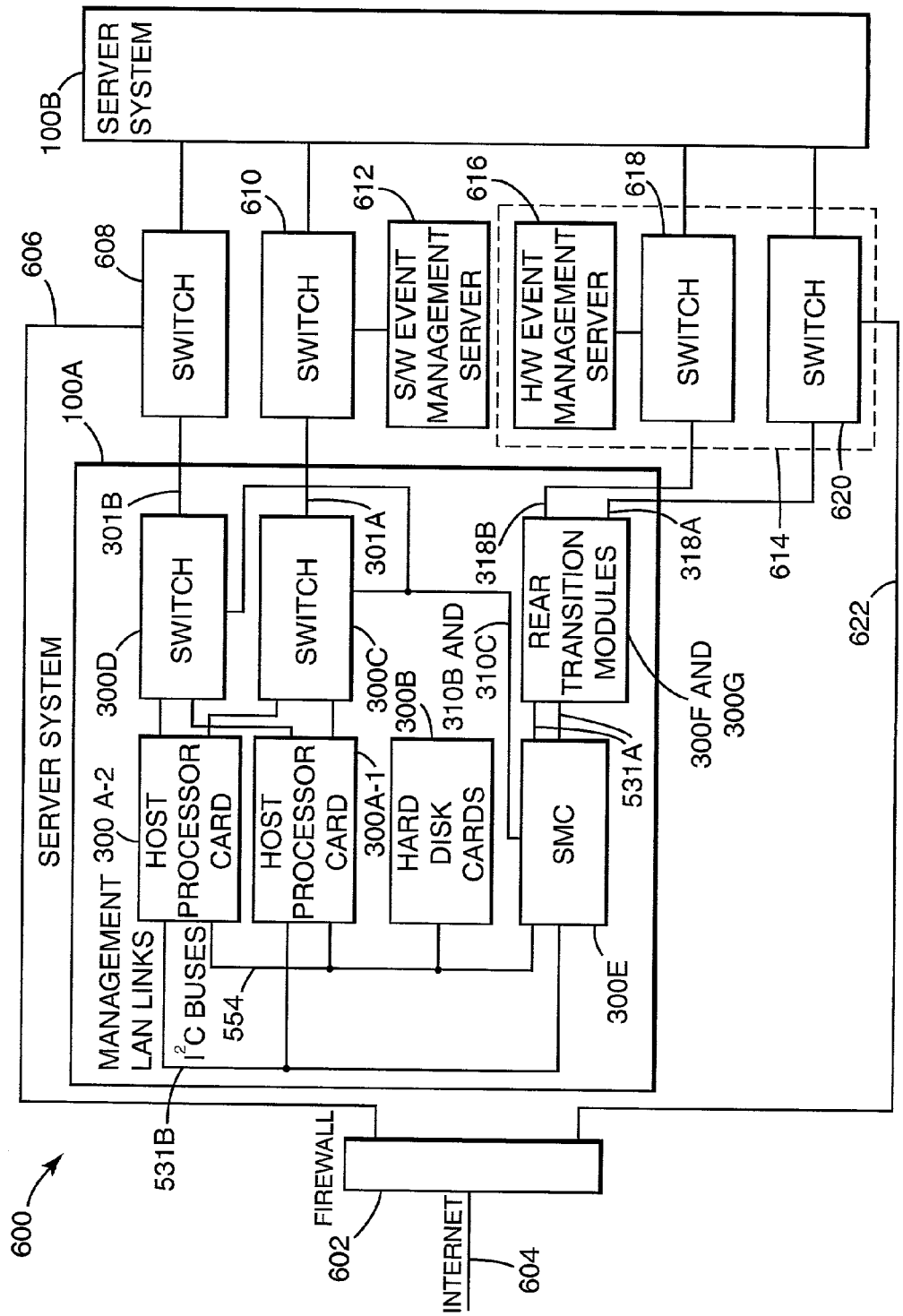
FIG. 6 is an electrical block diagram illustrating a network, including server systems according to one embodiment of the present invention.

FIG. 6 is an electrical block diagram illustrating a network 600, including server systems 100A and 100B (collectively referred to as server systems 100) according to one embodiment of the present invention. Network 600 includes firewall 602, server systems 100, LAN switches 608, 610, 618, and 620, software event management server 612, and hardware event management server 616. Server system 100A includes server management card (SMC) 300E, hard disk cards 300B, host processor cards 300A-1 and 300A-2 (collectively referred to as host processor cards 300A), Procurve switch cards 300C and 300D, and SMC rear transition modules 300F and 300G. As described above, SMC 300E is coupled to the management LAN connections of host processor cards 300A via links 531B. SMC 300E is also coupled to host processor cards 300A and hard disk cards 300B via I²C buses 554 for retrieving static and dynamic information from the cards as described above.

SMC 300E is connected to SMC rear transition modules 300F and 300G via links 531A for exchanging management LAN signals over external management network 320. In one embodiment, rear transition modules 300F and 300G include LAN links 318A and 318B (collectively referred to as LAN links 318) for connecting to external management network 320 (shown in FIG. 3). In one form of the invention, SMC 300E sends out console LAN signals via LAN link 318A, and simple network management protocol (SNMP) hardware events via LAN link 318B. In one embodiment, LAN link 318A is not used for events. Console LAN signals are exchanged between SMC 300E and host processor cards 300A over management LAN links 531B. Hardware events are sent by host processor cards 300A and hard disk cards 300B to SMC 300E over I²C buses 554 using internal IPMI commands.

Host processor cards 300A-1 and 300A-2 are each connected to Procurve LAN switches 300C and 300D. SMC 300E controls LAN switches 300C and 300D via backplane RS-232 links 310B and 310C. LAN switches 300C and 300D include LAN links 301A and 301B (collectively referred to as LAN links 301), respectively, for connecting to customer or payload LANs 303 (shown in FIG. 3). In one embodiment, host processor cards 300A send out SNMP software events via LAN link 301A. In one form of the invention, LAN link 301B is not used for events.

As shown in FIG. 6, console LAN link 318A is physically separated from the customer LAN links 301A and 301B. Additionally, infrastructure events such as failures are transmitted over the console LAN link 318A through the SNMP protocol, while customer events such as a failing operating system (OS) are transmitted on customer LAN link 301A. This provides both a logical and physical partitioning of communications over the two sets of LAN links 301 and 318. The faults of the infrastructure (e.g., hardware faults) can be hidden from the owners of the individual host processor cards 30A, if desired, and serviced transparently.

Hardware events are managed by H/W event management server 616. Hardware event management server 616 is connected to LAN link 318B via LAN switch 618. Software events are managed by software event management server 612. Software event management server 612 is coupled to customer LAN link 301A via LAN switch 610. Higher-level management software running on software event management server 612, such as Openview, Network Node Manager, Tivoli, TopTools, etc., can fault manage a server system 100A through the customer LAN via SNMP traps. The customer LANs can be aggregated, and can be monitored by different fault management software leased or bought under separate contracts.

In one embodiment, server system 100B is substantially the same as server system 100A. Server system 100A and server system 100B are coupled together via LAN switches 608, 610, 618, and 620. Switch 608 couples server systems 100A and 100B to customer LAN link 606. Customer LAN link 606 is connected to firewall 602. Switch 620 couples server systems 100A and 100B to console and/or management LAN link 622. LAN link 622 is connected to firewall 602. Firewall 602 is also coupled to the Internet 604. Firewall 602 provides security for network 600.

Hidden line 614 surrounds hardware event management server 616, and LAN switches 618 and 620. In one embodiment, hidden line 614 represents a physically secure area.

By physically separating the customer LANs 303 and the management LAN 320, the potential for outside "snooping" for control information on the customer LANs 303 is eliminated, thereby providing a more highly secure infrastructure that can be easily maintained. In addition, by partitioning the functionality of the two types of LANs 303 and 320, support contracts for the chassis provider can be separated from support contracts for the individual servers in the chassis slots.

With the integrated LAN switch 532 in SMC 300E for the console LAN signals and the pre-routed backplane 106, the customer of the SMC 300E does not have to manage a cable bundle for the console LAN signals. With the customer LANs 303 separate from the console LAN 320, each server "blade" in server system 100 can be an independent system with different payload information that goes outside the system 100 to a source such as the Internet 604. With this possibility of open access to server system 100, it is very desirable to have the console LAN signals inaccessible to accidental or malicious packets. With the console LAN signals physically unconnected to the general public, a higher level of security is automatically maintained.

Although specific embodiments have been illustrated and described herein for purposes of description of the preferred embodiment, it will be appreciated by those of ordinary skill in the art that a wide variety of alternate and/or equivalent implementations may be substituted for the specific embodiments shown and described without departing from the scope of the present invention. Those with skill in the chemical, mechanical, electro-mechanical, electrical, and computer arts will readily appreciate that the present invention may be implemented in a very wide variety of embodiments. This application is intended to cover any adaptations or variations of the preferred embodiments discussed herein. Therefore, it is manifestly intended that this invention be limited only by the claims and the equivalents thereof.

What is claimed is:

1. A server system comprising:
a plurality of host processor cards for providing management LAN communications separated from payload LAN communications;
a first card coupled to the plurality of host processor cards and coupled to a payload LAN, the plurality of host processor cards configured to provide payload LAN communications through the first card; and
a second card coupled to the plurality of host processor cards and coupled to a management LAN, the plurality of host processor cards configured to provide management LAN communications with the management LAN through the second card.

2. The server system of claim 1, wherein the first card is a LAN switch card.

3. The server system of claim 2, wherein the first card is a Procurve Ethernet LAN switch card.

4. The server system of claim 1, wherein the second card is a server management card.

5. The server system of claim 4, wherein the server management card is configured to monitor operation of the server system.

6. The server system of claim 5, wherein the server management card includes a management processor and a LAN switch, the LAN switch coupled to management connections of the host processor cards, and management connections of the management processor.

7. The server system of claim 4, and further comprising a backplane for connecting the plurality of host processor cards to the first card and the server management card.

8. The server system of claim 7, wherein the plurality of host processor cards are configured to communicate status information to the server management card via at least one I²C bus routed through the backplane.

9. The server system of claim 1, and further comprising:
a third card coupled to the plurality of host processor cards and coupled to a software event manager, the host processor cards configured to transmit software events through the third card to the software event manager.

10. The server system of claim 9, wherein the third card is a LAN switch card.

11. The server system of claim 9, wherein the plurality of host processor cards are configured to transmit hardware events to the second card.

12. A method of providing physically separate management LAN communications and payload LAN communications for a server system, the method comprising:
providing a plurality of host processor cards for providing management LAN communications and payload LAN communications;
routing management LAN communications from the plurality of host processor cards through a server management card;
routing management LAN communications from the server management card to a management LAN;
routing payload LAN communications from the plurality of host processor cards through a first LAN switch; and
routing payload LAN communications from the first LAN switch to a payload LAN.

13. The method of claim 12, wherein the server management card is configured to monitor operation of the server system.

14. The method of claim 12, wherein the server management card includes a management processor and a LAIN switch, the method further comprising:
routing management communications from the plurality of host processor cards and the management processor through the LAN switch of the server management card to the management LAN.

15. The method of claim 12, and further comprising:
transmitting status information from the plurality of host processor cards to the server management card via at least one I²C bus routed through a backplane of the server system.

16. The method of claim 12, and further comprising:
transmitting software events from the plurality of host processor cards through a second LAN switch to a software event manager.

17. The method of claim 12, and further comprising:
transmitting hardware events from the plurality of host processor cards through the server management card to a hardware event manager.

18. A server system comprising:
a backplane;
a plurality of host processor cards coupled to the backplane;
a LAN switch card coupled to the plurality of host processor cards through the backplane and coupled to a payload LAN, the plurality of host processor cards configured to provide payload LAN communications through the LAN switch card; and
a server management card coupled to the plurality of host processor cards through the backplane and coupled to a management LAN, the plurality of host processor cards configured to provide management LAN communications with the management LAN through the server management card.

19. The server system of claim 18, and further comprising:
a second LAN switch card coupled to the plurality of host processor cards through the backplane and coupled to a software event manager, the host processor cards configured to transmit software events through the second LAN switch card to the software event manager.

20. The server system of claim 18, wherein the plurality of host processor cards are configured to transmit hardware events to the server management card.

* * * * *

UNITED STATES PATENT AND TRADEMARK OFFICE
CERTIFICATE OF CORRECTION

PATENT NO. : 7,103,654 B2  Page 1 of 1
APPLICATION NO. : 09/923881
DATED : September 5, 2006
INVENTOR(S) : Thane M. Larson et al.

It is certified that error appears in the above-identified patent and that said Letters Patent is hereby corrected as shown below:

In column 13, line 1, in Claim 2, delete "the." and insert -- the --, therefor,

In column 14, line 2, in Claim 14, delete "LAIN" and insert -- LAN --, therefor.

Signed and Sealed this

Fifth Day of January, 2010

David J. Kappos
*Director of the United States Patent and Trademark Office*